Jan. 9, 1968   E. I. GROVE   3,363,047
WELDING CABLE CONSTRUCTION
Filed March 17, 1966
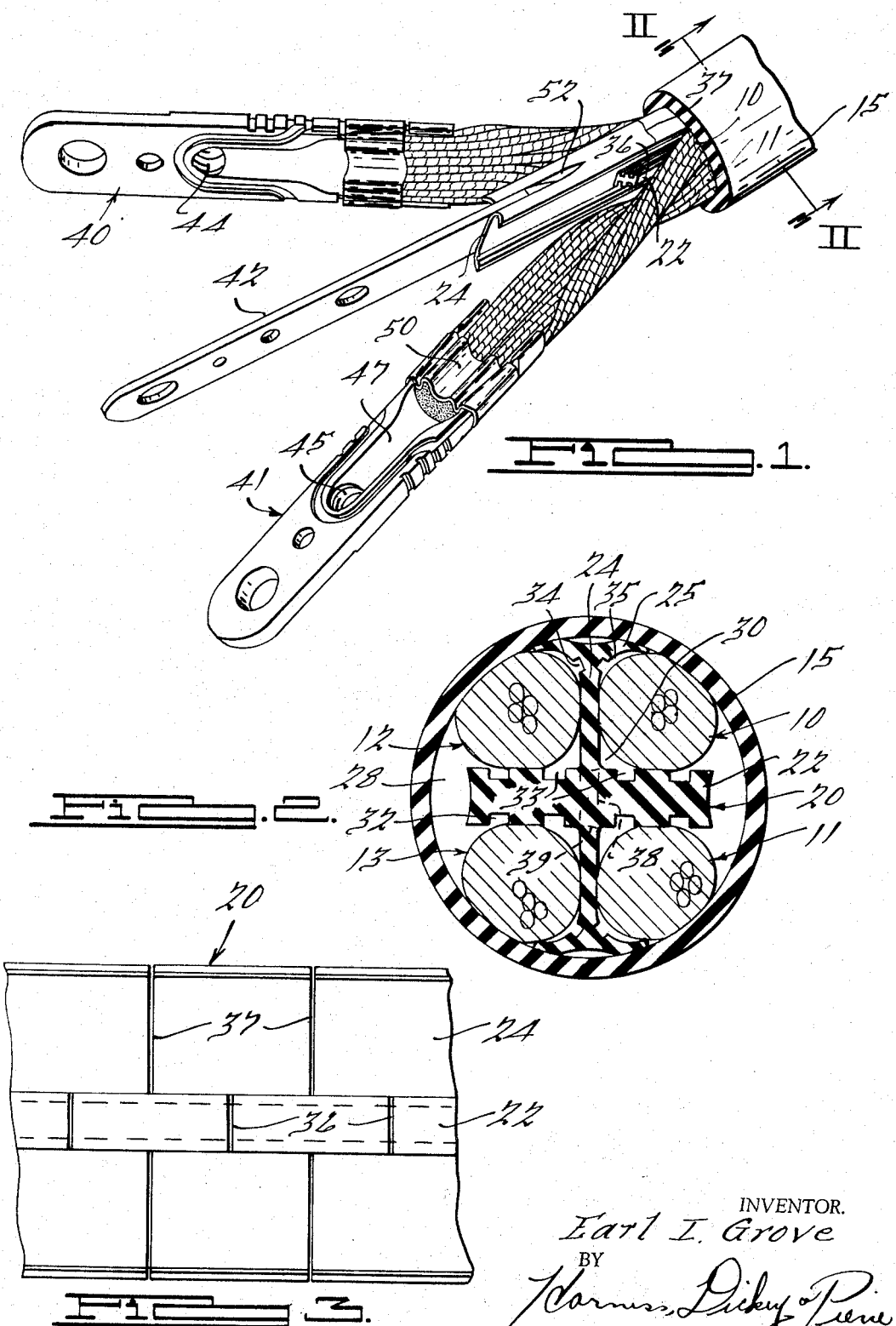
INVENTOR.
Earl I. Grove
BY
Harness, Dickey & Pierce
ATTORNEYS.

United States Patent Office 3,363,047
Patented Jan. 9, 1968

3,363,047
WELDING CABLE CONSTRUCTION
Earl I. Grove, Walled Lake, Mich., assignor to Gar Wood Industries, Inc., Wayne, Mich., a corporation of Michigan
Filed Mar. 17, 1966, Ser. No. 535,122
2 Claims. (Cl. 174—15)

ABSTRACT OF THE DISCLOSURE

A water-cooled welding cable of the so-called "kickless" type incorporates four conductor ropes, individually segregated by an X-type flexible separator extending therethrough and which is bodily helically twisted, with the conductor ropes, within the water-jacketing hose. The X-separator has a thin diametric web which insulates from one another the two conductors which are of unlike polarity, and a thicker web which acts to space the two conductors of like polarity from one another by a greater distance. The thicker web is also of lesser height, in a radial direction, to provide a substantial water channel area in each section. The webs have staggered radial slits to facilitate the helical twisting of the internal assembly and to increase the flexibility of the complete cable. Small supplemental longitudinal water channel grooves are provided in those portions of the webs overlaid by the conductor ropes.

The purpose of this abstract is to enable the Patent Office and the public generally and especially the scientist, engineer or practitioner in the art who is not familiar with patent or legal terms or phraseology to determine quickly from a cursory inspection the nature and essence of the technical disclosure of the application. The abstract is neither intended to define the invention of the application, which of course is measured by the claims, nor is it intended to be limiting as to the scope of the invention in any way.

---

The present invention relates to an improved welding cable construction. The overall objectives of the invention may be summarized as comprehending the provision of a flexible water cooled welding cable combining to a high degree the characteristics of high electrical efficiency, long life under severe service conditions, low initial cost, and low maintenance and service costs.

The electric cables employed to conduct welding current to the electrodes of resistance welding machines have been the subject of much research and development directed toward the attainment of the above indicated objectives of long life combined with high electrical efficiency in a cable which can be quickly and easily serviced when necessary with a minimum loss of production time. Such cables are not only typically subjected to many thousands of flexures due to movements of the electrodes, but are required to carry intermittent or alternating currents of high amperage which impose additional severe physical forces due to the reactance between individual conductors. The conductors are alternately repelled from and attracted toward one another in a manner which causes severe impacts and bending of the individual components of the cable, creating additional stressing and frictional wear. These effects have an important bearing upon the life of the cable. Over the past few years weldings cables have been improved in the respects indicated to such extent that whereas in a severe application twenty years ago a cable might have an effective life corresponding to two hundred fifty thousand welds, successive developments over the years have achieved a degree of improvement such that a present day cable under the same conditions would be capable of enduring for an effective life of forty-eight million welds or more. Maintenance of electrical efficiency and reduction of wear are also affected by the efficiency of cooling of the cable. The cable of my present invention is constructed in such a manner that effective service life is still further lengthened, while the cost of the cable is reduced, frictional rubbing and induction-induced impacting of the strands of the individual conductors against one another being minimized so that wear is reduced while cooling is improved and electrical efficiency is maintained at a high level.

Other objects and advantages will be apparent upon consideration of the present disclosure in its entirety.

In the drawing:

FIGURE 1 is a perspective view of one end of a welding cable constructed in accordance with the present invention, showing the terminal sections and adjacent portions of the cables separated and spread apart, and with the external hose removed from the separated area;

FIGURE 2 is a cross section on a larger scale taken substantially on the line II—II of FIGURE 1, and looking in the direction of the arrows; and FIGURE 3 is a fragmentary elevational view of the separator.

Referring now to the drawing:

The illustrated cable is indicated as formed of four "ropes," comprising ropes 10 and 11 of one polarity, designated as "positive" and two ropes 12 and 13 of opposite polarity designated as "negative." It will be appreciated that the polarity may alternate and that these designations are merely for reference. Each rope is comprised of a large number of bare strands of fine-gauge copper having a helical twist and each rope is preferably constructed in the manner disclosed in Grove United States Patent No. 3,079,460.

The ropes are enclosed in a flexible casing hose 15, which may be formed of a reinforced insulating elastomer such as soft rubber. A separator of generally X-shape and which is generally designated 20 is provided, formed of relatively soft and flexible synthetic rubber or the like and extending longitudinally within the hose 15 to segregate the interior thereof into quadrant-sectioned longitudinal compartments for the individual ropes. The separator and ropes preferably have an overall helical twist in the hose.

The diametric wall portion 22 of the separator which extends between the ropes of like polarity, and isolates such ropes from one another, is relatively thick in its transverse dimension, so that the ropes of like polarity are relatively widely spaced from one another. The diametric web 24 perpendicular to web 22 and which extends between and isolates from one another the ropes of unlike polarity is relatively thin in its transverse dimension, so that the ropes of unlike polarity lie close to one another. Increased electrical efficiency is attained by such relative spacing.

The synthetic rubber or other elastic insulating material of the hose and separator 20 is preferably of low frictional characteristics, so that as the cable is flexed a minimum of frictional wear occurs due to rubbing against these surfaces.

The outer edges of the thinner web 24 are provided with T-flange portions 25 extending laterally therefrom and the parts are so proportioned that when installed, the ends of flange portions 25 are resiliently pressed inwardly against the peripheries of the ropes, and as best shown in FIGURE 2, the ropes are also partially distorted between the separator and hose walls. Thus the strands of the twisted ropes are substantially confined against undue movement in transverse directions away from one another as field changes occur, and the "sloping" of the strands under such forces is minimized.

The thicker web 22 does not extend the full diameter of the interior of the hose, leaving a substantial water space along the outer edges of web 22 as generally indicated at 28. Also, as best shown in FIGURE 2 substantial water channels are provided in the areas designated 30 near the center where the webs 22, 24 join and beneath the individual ropes. The side surfaces of the webs 22 are also provided with longitudinally extending water channel grooves 32, 33. The grooves 33 are located near the center and provide, in effect, increased water carrying capacities for the spaces 30 beneath the ropes.

Longitudinal water channels 34 are also preferably provided on each side of the thinner web 24 at the junctures of the end flange portions 25 thereof with the main web. In addition, the radius of curvature of the under surfaces of flange portions 25 and adjoining areas of the sides of webs 24 is preferably somewhat shorter than the radius of the adjacent portions of the installed ropes, so that a longitudinally extending water channel 35 is formed on each side of each web 24 between the web and flange portions 24, 25 and the adjacent part of the rope, channels 35 being augmented in capacity by the longitudinal channels 34, so that a substantial water flow can occur in this region to assist in cooling the strands.

At spaced intervals the webs are slotted inwardly from their outer edges, transversely of the axis, to positions near but spaced from the center. The slots 37 in webs 24 are narrow enough to eliminate any danger of short circuiting strands of opposite polarity, and such slots are preferably staggered with relations to slots 36 in webs 22. The inner limits of slots 36 are indicated at 38 in FIGURE 2 and the inner limits of slots 37 at 39. Slots 36, 37 improve cooling and increase the flexibility of the cable.

Although the terminal construction per se forms no part of my present invention, my improved cable is so designed as to be adapted to be utilized with a standardized terminal construction such as that illustrated in Wreford et al. Patent No. 2,906,807. Such terminal is comprised of two generally semicylindrical sections 40, 41, each of which constitutes a terminal for the ropes of one polarity, such sections having diametric planar inner portions insulated from one another by a thin planar insulating sheet 42, and as is known in the art, the parts when secured together also form a sealed water-tight feeding connection for introducing cooling water into the interior of the hose 15. When the terminal parts are secured together they form a cylindrical assembly conforming substantially to the diameter of the cable assembly and to the internal diameter of the hose 15 and the hose, although broken off in FIGURE 1 extends forwardly when installed, to a position substantially overlapping the terminal portions 40, 41, and is sealed thereto by clamping rings or suitable securing means (not shown, and the terminal sections are also sealed with respect to the separator 22 and to each other.

As brought out in the Wreford et al. patent referred to, and also in Wreford Patent No. 2,797,255, transverse metallic web portions as 50 at the rear ends of the terminals are pressed tightly against the ends of the ropes, compressing and frictionally holding the latter, and may also be secured thereto by solder, and the depressed central portions of such transverse securing web 50 forms in effect a continuation of internal water channels 47 in the terminal, through which water introduced through suitable ports 44, 45 may pass to the interior of the hose and thus into the water channel portions, already described, in the cables. Terminals of the indicated character have the advantage that the hose when loosened can be slid off over a terminal for replacement or other servicing.

The ropes of one polarity such as the ropes 10 and 11 which lie on the same side of the divider webs 24 are separated throughout most of their length by the thickened webs 22 as previously described and as shown in FIGURE 2. As brought out in FIGURE 1, however, the webs 22 terminate a substantial distance from the rear end of the terminal, which distance may be of the order of four to five inches. Such spacing promotes free flow of water into and out of the hose and the terminal at the extremities of the cable.

The polarity dividing web 24 is split at each terminal end as indicated at 52 in FIGURE 1, and sealed against opposite sides of the insulating divider 42, a portion of the divider extending beyond the rear ends of the terminal into the hose area for this purpose. Continuous insulation is thereby provided between the rope portions of opposite polarity.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a flexible high-amperage electric cable construction including a plurality of flexible electrical conductors and a multi-polar terminal structure including a first terminal part of one polarity connected to a plurality of the conductors and a second terminal part of another polarity connected to a plurality of others of the conductors, the novelty which comprises a relatively thin flexible separator portion extending longitudinally between and isolating from one another conductors of unlike polarity, and a relatively thicker flexible separator portion extending longitudinally between and isolating from one another conductors of like polarity.

2. A cable construction as defined in claim 1 wherein the conductors and separators are enclosed in a hose adapted to contain a circulating liquid coolant, and comprising a total of four multi-stranded conductors with two of like polarity connected to each terminal part, the separator portions comprising four integral webs dividing the interior of the hose into passages of quadrant cross-section, the thinner web portions lying in a diametric plane and the thicker web portions lying in another diametric plane perpendicular to the first mentioned plane, the thinner web portions extending to substantially sealed uninterrupted juncture with the interior of the hose and the thicker web portions being spaced from the hose.

References Cited

UNITED STATES PATENTS

| | | | |
|---|---|---|---|
| 2,888,510 | 5/1959 | Tribe | 174—15 |
| 3,043,901 | 7/1962 | Gerwing et al. | 174—15 |
| 3,065,290 | 11/1962 | Grove | 174—15 |
| 3,163,704 | 12/1964 | Leathers | 174—15 |

LEWIS H. MYERS, *Primary Examiner.*

H. HUBERFELD, A. T. GRIMLEY,
*Assistant Examiners.*